United States Patent
Kaibach et al.

[19]

[11] Patent Number: 6,012,887

[45] Date of Patent: Jan. 11, 2000

[54] UNDERCUT SELF-CUTTING ANCHOR

[75] Inventors: Werner Kaibach, Buchloe; Stefan Raber, Kaufering, both of Germany

[73] Assignee: Hilti Aktiengesellschaft, Schaan, Liechtenstein

[21] Appl. No.: 09/211,889

[22] Filed: Dec. 15, 1998

[30] Foreign Application Priority Data

Dec. 20, 1997 [DE] Germany .............. 197 56 998

[51] Int. Cl.⁷ .............. F16B 13/04; F16B 13/06
[52] U.S. Cl. .............. 411/30; 411/54.1; 411/60.3
[58] Field of Search .............. 411/30, 31, 54, 411/54.1, 60.1, 60.3

[56] References Cited

U.S. PATENT DOCUMENTS

| | | | |
|---|---|---|---|
| 4,560,311 | 12/1985 | Herb et al. | 411/54 |
| 4,818,163 | 4/1989 | Bereiter et al. | 411/54 |
| 4,929,134 | 5/1990 | Bergner . | |
| 5,205,689 | 4/1993 | Fischer . | |
| 5,609,453 | 3/1997 | Fischer | 411/54 |
| 5,816,760 | 10/1998 | Mattner et al. | 411/30 |

FOREIGN PATENT DOCUMENTS

| | | |
|---|---|---|
| 0067941 | 12/1982 | European Pat. Off. . |
| 0195188 | 9/1986 | European Pat. Off. . |
| 4333471 | 6/1994 | European Pat. Off. . |

*Primary Examiner*—Neill Wilson
*Attorney, Agent, or Firm*—Brown & Wood, LLP

[57] ABSTRACT

An undercut self-cutting anchor including an anchor rod (2) having a stem(3) provided with a load application element (4) at its rear end and with a head portion (5) at its opposite end, with the head portion (5) widening toward a front end (6) of the anchor rod (2), and an expansion sleeve (8) longitudinally displaceable over the head portion (5) and having, at its end adjacent to the head portion (5), a plurality of expansion tabs (11), which are separated from each other by longitudinal slots (10) and extending in a direction toward the head portion (5), and a plastic hinge-forming transition region (13) extending toward the expansion tabs (11), with a wall thickness (t) of the expansion sleeve (8) in the transition region (13) decreasing in a direction toward a front end (9) of the expansion sleeve.

17 Claims, 2 Drawing Sheets

UNDERCUT SELF-CUTTING ANCHOR

BACKGROUND OF THE INVENTION

1. Field of the Invention

The present invention relates to an undercut self-cutting anchor including an anchor rod having a stem provided with load application means at its rear end and with a head portion at its opposite end, with the head portion having a diameter increasing toward a front end of the anchor rod, and an expansion sleeve longitudinally displaceable over the head portion and having, at its end adjacent to the head portion, a plurality of expansion tabs separated from each other by longitudinal slots and extending in a direction toward the head portion.

2. Description of the Prior Art

In anchoring technology, it is often necessary to form connections which are expansion pressure-free to the greatest possible extent. In particular, with small edge and axis distances, the anchoring with conventional spreading anchors or dowels involves a danger of fracture of a constructional component and even of its stratification. For such distance-critical and for many reliability-critical connections, anchoring systems are used with which a specifically formed attachment member, usually formed of metal, is formed lockingly anchored in a prepared bore formed in a constructional component. To this end, the bore is provided, at a certain depth, with an undercut. The attachment member, which is to be anchored in the prepared bore, includes an anchor rod having a head portion the diameter of which increases toward the free end of the anchor rod, and an expansion sleeve having a plurality of expansion tabs separated from each other by axial slots. The relative displacement between the expansion sleeve and the anchor rod provides for radial displacement of the expansion tabs, which slides over the head portion of the anchor rod, into the undercut.

In many cases for forming an undercut a special tool, which is equipped with cutters and is eccentrically rotatable in the bore, is used. The tool removes material from the wall of the preliminary formed bore by milling or shaving to widen the wall at a desired depth. Also known are undercut self-cutting anchors which automatically form an undercut during a setting process. German Publication DE-A-31 46 027 discloses an undercut self-cutting anchor which forms an undercut by removing the wall material by chiseling as a result of axial displacement of the expansion sleeve along the anchor rod supported on the bore bottom. Another type of an undercut self-cutting anchor is disclosed in U.S. Pat. No. 4,702,654. The anchor disclosed in this U.S. patent forms an undercut by milling and shearing the bore wall material. To this end, the expansion sleeve is additionally rotated upon being axially displaced along an anchor rod which is supported on the bore bottom. The expansion tabs of the expansion sleeve are provided with cutters which remove the wall material during rotation of the sleeve and thereby form an undercut.

A drawback of the known undercut self-cutting anchor consists in that the tractrix of the expansion tabs, i.e., the curve course which is described by the outer profile of the expansion tabs in a longitudinal direction during their expansion, does not correspond to the cutting curve which defines the profile of the undercut. Therefore, often the expansion tabs only linearly engage the undercut surface in their end position. As a result, the load is lead into the constructional component non-uniformly. Only after a pre-stress of the undercut self-cutting anchor, an approximately surface engagement is provided, which is accompanied by overpressure in the contact region of the constructional component and by deformation of the expansion tabs. At that, the constructional component can be overstressed, which can adversely affect the desired holding values.

Accordingly, an object of the present invention is to eliminate the drawbacks of the prior art undercut self-cutting anchor. Another object of the present invention is to provide an undercut self-cutting anchor which would create preconditions for a most possible uniform load lead-in into the constructional component. Yet another objection of the present invention is to provide an undercut self-cutting anchor which would insure a very high load-bearing capability of the anchor. A further object of the invention is an undercut self-cutting anchor which would prevent a distortion of the constructional component in the region of the undercut upon application of a load.

SUMMARY OF THE INVENTION

These and other objects of the present invention, which will become apparent hereinafter, are achieved by providing an undercut self-cutting anchor including an anchor rod having a stem provided with load application means at its rear end and with a head portion at its opposite end and the diameter of which increases toward a front end of the anchor rod, and an expansion sleeve longitudinally dislaceable over the head portion. The sleeve has, at its end adjacent to the head portion a plurality of expansion tabs separated from each other by longitudinal slots and extending in a direction toward the head portion. The expansion sleeve further has a plastic hinge-forming transition region extending toward the expansion tabs and having a wall thickness decreasing in a direction toward a front end of the expansion sleeve.

The shape of the plastic hinge according to the present invention with the wall thickness of the expansion sleeve decreasing toward its front end in the region of the plastic hinge, insures a predetermined plastic deformation of the expansion sleeve in the region of the plastic hinge upon radial expansion of the expansion tabs as a result of displacement of the expansion sleeve over the head portion of the anchor rod. The deviation regions of the expansion tabs, which extend in a radial direction, displace rearwardly from the smallest diameter section of the plastic hinge with increased displacement of the expansion sleeve over the head portion, the diameter of which increases toward the front end of the anchor rod. As a result, the expansion tabs do not swing out mere radially. By being displaced to a certain extent rearwardly the expansion tabs additionally assume a profile during the setting process. This provides a pre-condition for a best possible correspondence between the cutting curve and the tractrix of the expansion tabs. The formed undercut has a better correspondence with the geometry of the expansion tabs, and a surface contact is insured to a most possible extent. During a load lead-in, the forces are uniformly distributed in the constructional component, and the danger of the constructional component being subjected to overpressure is substantially reduced.

The plastic hinge-forming transition region of the expansion sleeve can be formed by a section of the through-bore of the expansion sleeve which widens in a direction toward the front end of the expansion sleeve. However, from the manufacturing point of view, it is advantageous when the expansion sleeve has, in the transition region, a decreasing outer diameter. In addition to the manufacturing advantages, this design measure provides a free space in the region of the expansion tabs which can be used for receiving the wall material removed during the formation of the undercut.

For functioning of the plastic hinge, it is advantageous when the transition region, in which the wall thickness of the expansion sleeve is reduced, has a length according to the expression $0.5D \leq \lambda \leq 3.0D$, with the length being preferably $1.0D \leq \lambda \leq 2.0D$, where D is the connection diameter of the anchor rod. The length of the plastic hinge-forming transition region according to the present invention insures a most possible adaptation of the expansion tabs to the profile of the outer surface of the head portion of the anchor rod. In addition, the selected length of the plastic hinge-forming transition region insures that a relatively large free space is provided for receiving the material removed from the bore wall during the anchor setting process, in particular, when a rotary-percussion setting process is used for anchoring an undercut self-cutting anchor.

The expansion sleeve has, in the plastic hinge-forming transition region, a minimal wall thickness according to an expression $0.05T \leq m \leq 1.0T$, preferably, $0.2T \leq m \leq 0.5T$, where T is half of the difference between the outer diameter of the expansion sleeve and the connection diameter of the anchor rod. The selected minimal wall thickness insures that the expansion sleeve does not break down under a predetermined loading of the plastic hinge. The plastic hinge-forming transition region can have a thickness which decreases toward the minimal diameter section stepwise. However, for a uniform displacement of the deviation region of the plastic hinge rearward it is advantageous when the wall thickness decreases gradually. Therefore, the expansion sleeve has, in the transition region, a substantially conical profile an outer surface of which is inclined to the axis of the expansion sleeve at an angle between about 2° and 17°, preferably between 5° and 11°.

In a preferred embodiment according to the present invention, the expansion tabs have each a shoulder-like projecting region adjoining a smallest wall thickness section of the plastic hinge-forming transition region and having a substantially annular bearing surface. The bearing surface, in an initial position of the expansion sleeve, forms with the axis of the expansion sleeve an angle from about 13° to about 33°, preferably, from 18° to 28°. At the end of the setting process, the bearing surface of the shoulder-like projecting region abuts the bore wall. This insures a positive centering of the expansion sleeve in the bore, and the bearing surface supports the bore wall in the transitional region between the cylindrical surface of the bore wall and the undercut. This prevents shearing off of the transitional region upon loading of the anchor.

For functioning of an undercut self-cutting anchor, in particular in case of an anchor anchored by using a rotary percussion setting process, the length of longitudinal slots, which separate the expansion tabs, is important. On one hand, the slots should have a minimal length to insure an orderly expansion of the expansion tabs. On the other hand, the length of the slots should not exceed a maximal length to insure plastic deformation of the expansion tabs in the circumferential direction and to even insure folding of the expansion tabs during the rotary-percussion setting process. Therefore, the length of the slots is selected in accordance with an expression $1.0h \leq s \leq 3.0h$, preferably $1.3h \leq s \leq 2.2h$, where h is the length of the expansion tabs from the end of the plastic hinge to the front end of the expansion sleeve, with the length of the expansion tabs being from about 0.15D to about 2.0D, preferably, from 0.3D to 1.3D. This length of the expansion tabs proved to be advantageous. Here, D designates the connection diameter of the anchor rod.

To further improve the correspondence between the cutting curve and the tractrix of the expansion tabs, the expansion tabs advantageously have toroidally curved outer surfaces. At that, the head portion of the anchor rod has an outer surface which is likewise curved, with the curvature of outer surface increasing toward the free end of the anchor rod so that it has essentially a bell-shaped profile. This geometry of the outer surface of the head portion, in particular, with the toroidal profile of the expansion tabs, insures an optimal correspondence between the cutting curve and tractrix of the radially expandable expansion tabs during the setting process.

BRIEF DESCRIPTION OF THE DRAWINGS

The features and objects of the present invention will become more apparent, and the invention itself will be best understood from the following detailed description for the preferred embodiments when read with reference to the accompanying drawings, wherein?

DETAILED DESCRIPTION OF THE PREFERRED EMBODIMENT

Figure 1:
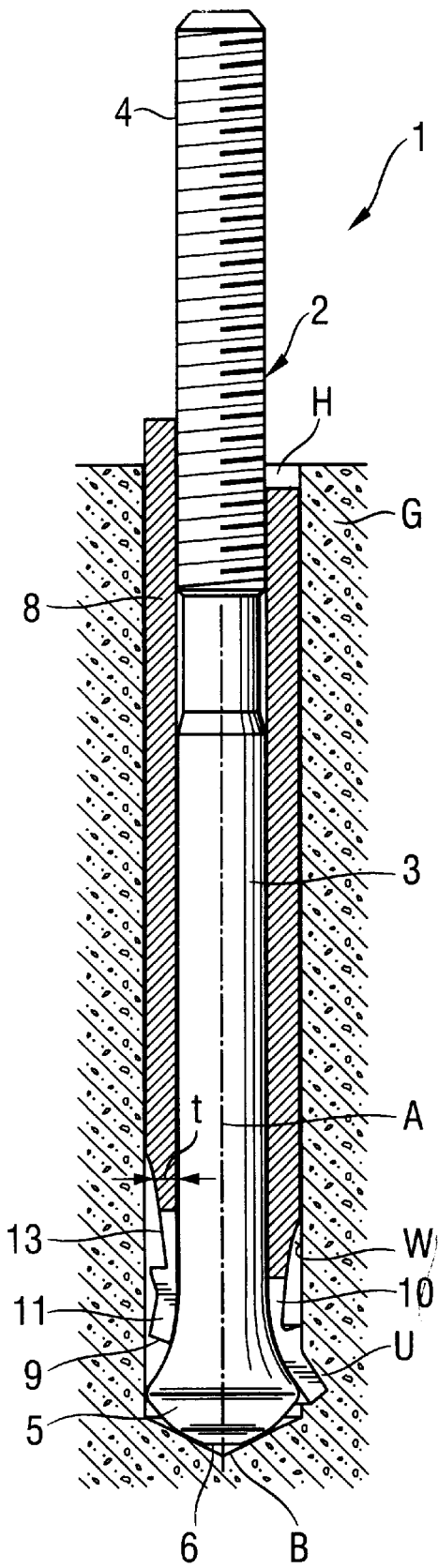
FIG. 1 shows a longitudinal cross-sectional view of an undercut self-cutting anchor according to the present invention with the expansion sleeve in its initial position (left-side of the drawing) and in its end position (right side of the drawing)

An undercut self-cutting anchor, which is shown in FIG. 1, is generally designated with a reference numeral 1. The undercut self-cutting anchor is inserted into a bore H formed in a constructional component G, e.g., formed of concrete. In FIG. 1, the left side of the drawing shows the anchor 1 in its initial position, and the right side of the drawing shows the anchor 1 in its end, anchored position. The anchor 1 has an anchor rod 2 including a cylindrical stem 3. The cylindrical stem 3 has, at its rear end partially projecting from the bore H, an outer thread 4 which serves as load application means. At its opposite end, the stem 3 has a head portion 5 the diameter of which increases toward the front end 6 of the anchor rod 2. The anchor 1 further includes an expansion sleeve 8 axially displaceable over the stem 3. A common axis of the anchor rod 2 and the expansion sleeve 8 is designated with a letter A. At its end adjacent to the head portion 5, the expansion sleeve 8 is provided with expansion tabs 11 which are separated from each other by longitudinal slots 10

The expansion tabs 11 are equipped with cutters, not shown in detail. Upon displacement of the expansion sleeve 8 over the head portion 5, which is supported on the bore bottom B, the cutters chisel, during the expansion sleeve 8 being only percussion driven over the head portion 5, or mill and shave, during the expansion sleeve 8 being rotary-percussion driven over the head portion 5, the material of the bore wall W to form an undercut U for formlockingly anchoring the anchor 1 in the constructional component G.

Upon the expansion sleeve 8 being driven over the head portion 5 having an ever increasing diameter, the expansion tabs 11 expand radially. The expansion tabs 11 pivot about a plastic hinge which is formed by an axially extending transition region 13 between the cylindrical portion of the expansion sleeve 8 and the expansion tabs 11. In the region of the transition region 13, the expansion sleeve 8 has a thickness t which diminishes toward the front end 9 of the expansion sleeve 8. The reduction of the thickness of the expansion sleeve 8 in the transition region 13 results in formation of a plastic hinge having an axially variable deviation region. During the percussion driving of the expansion sleeve 8, the plastic hinge-forming transition region 13 first yield in its region having the smallest wall thickness. Upon further driving of the expansion sleeve 8 over the head portion 5, the axially variable deviation region, which is defined by the transition region 13, displaces rearwardly, with the increase of the wall thickness t of the expansion sleeve 8.

Figure 2:
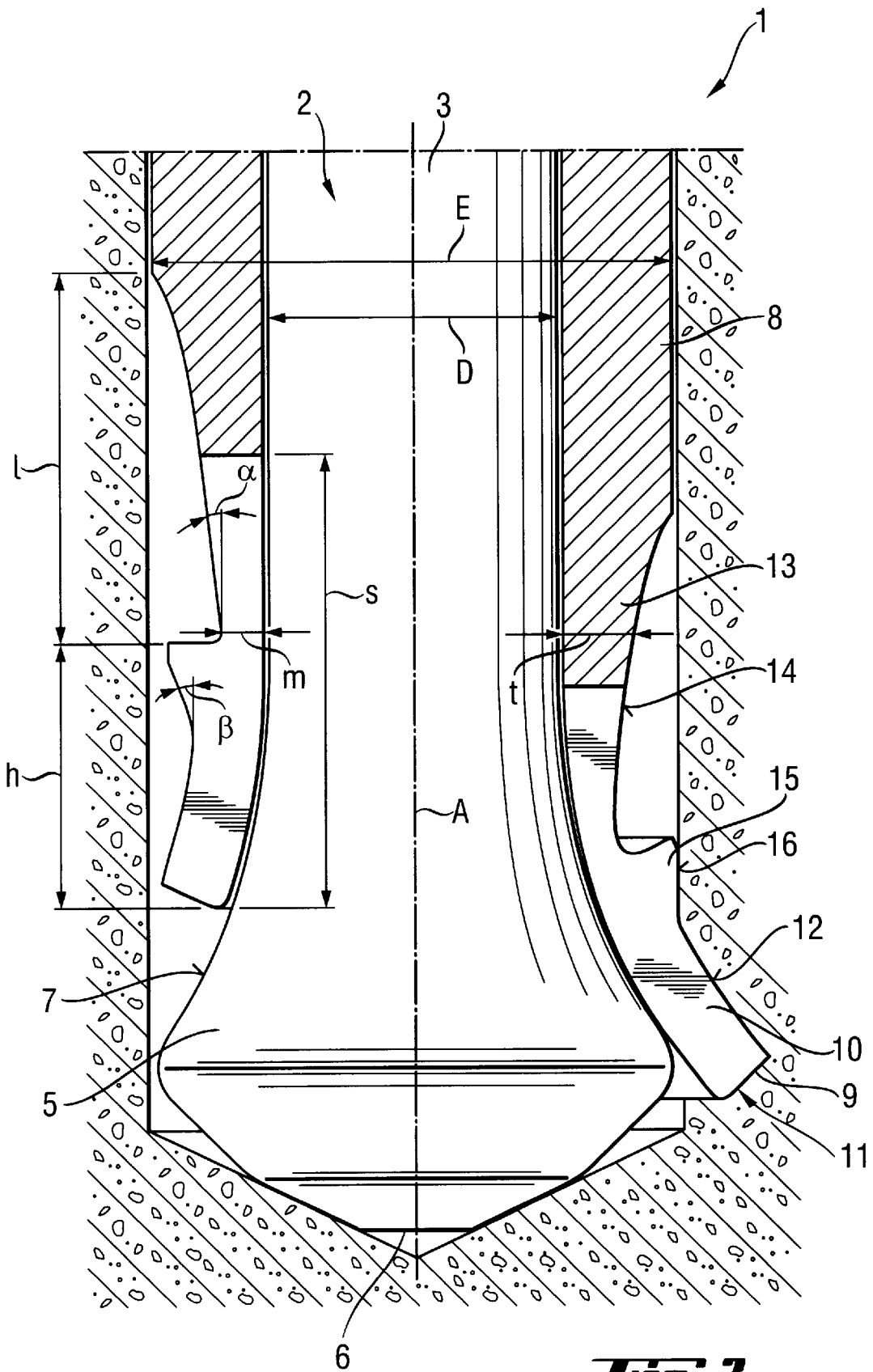
FIG. 2 shows a longitudinal cross-sectional view of a front region of the undercut self-cutting anchor shown in FIG. 1 at an increased scale.

FIG. 2 shows a front region of the anchor 1, which is shown in FIG. 1, at an increased scale. As in FIG. 1, the left side of the drawing shows the anchor 1 with its expansion sleeve 8 in its initial position, and the right side of the drawing shows the anchor 1 with its expansion sleeve 8 in its end, anchored position. The left and right regions of the drawing are separated by the axis A of the anchor rod 1. During anchoring of the anchor 1, the head portion 5, which is formed as one piece with the stem 3 of the anchor rod 2, is supported on the bore bottom. As shown in FIG. 2, the transition region 13 between the cylindrical portion of the expansion sleeve 8 and the expansion tabs 11 extends over a length 1. The length 1, along which the wall thickness t of the expansion sleeve 8 decreases up to a minimal wall thickness m, is so selected that $0.5D \leq l \leq 3.0D$ and, preferably, $1.0D \leq l \leq 2.0D$, where D is a connection diameter of the anchor rod 2. The transition region 13 has a substantially conical outer surface 14 which is inclined the axis A of the expansive sleeve 8 at an angle α between about 2° and about 17°, preferably, between about 5° and about 11°. The minimal wall thickness m is selected from a range according to the following expression $0.05T \leq m \leq 1.0T$ preferably $0.2T \leq m \leq 0.5T$, where T is half of the difference between an outer diameter E of the expansion sleeve 8 and the connection diameter D of the anchor rod 2.

Projecting shoulder-like regions 15 of the expansion tabs 11 adjoin the minimal thickness section of the transition region 13. The shoulder like region 15 has a bearing surface 16 which is inclined to the axis A at an angle β which amounts from about 13° to about 33° and, preferably from 18° to 28°. In radially expanded position of the expansion tabs 11, the bearing surfaces 16 of the shoulder-like projections 15 abut the bore wall and support the transitional region of the bore wall between the cylindrical surface and the undercut against shearing off. An outer surface portion 12, which extends from the bearing surface 26 toward the front end 9 of an expansion tab 11, has a toroidal concave shape. The length of the expansion tabs 11 from the end of the plastic hinge-forming transition region 13 toward the front end 9 of the expansion tabs 11 is designated with a letter h. The length h of the tabs 11 is so selected that it is $0.15D \leq h \leq 2.0D$ and, preferably, $0.3D \leq h \leq 1.3D$.

As shown in FIG. 2, the longitudinal slots 10, which separate the expansion tabs 11, have a length s which is $1.0h \leq s \leq 3.0h$ and, preferably, $1.3h \leq s \leq 2.2h$. The anchor 1, t he anchor rod 2 of which has a connection diameter of 10 mm, has, e.g., a slot length of a bout 14 mm. With a connection diameter D of the anchor rod 2 being equal 12 mm or 16 mm, the slot length s amounts to, e.g., about 18 mm and about 25 mm. As also shown in FIG. 2, the head portion 5 has a curved run-on surface 7, with the curvature increasing from the cylindrical stem 3 toward the free end 6 off the anchor rod 2. The run-on surface 7, along which the expansion tabs 11 slide during the setting process, has somewhat a shape of an outer surface of a bell.

The geometry of the plastic hinge-forming transition region 13, of the expansion tabs 11, and of the head portion 5 according to the present invention insures an optimal matching of the cutting curve and the tractrix of the expansion tab 11 during the anchor setting process. The axially extending plastic hinge-forming transition region 13 provides for an optimal adaptation of the expansion tabs 11 with respect to run-on surface 7 of the head portion 5. The substantially conical extent of the outer surface 14 of the transition region 13 insures that a space is provided between the expansion sleeve 8 and the bore wall. The space between the expansion sleeve 8 and the bore wall can be used for receiving a portion of the bore wall material removable from the bore wall during the formation of the undercut.

Though the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. An undercut self-cutting anchor, comprising an anchor rod (2) having a stem (3) provided with load application means (4) at a rear end thereof and provided with a head portion (5) at an opposite end thereof, the head portion (5) having a diameter increasing toward a front end (6) of the anchor rod (2); and an expansion sleeve (8) longitudinally displaceable over the head portion (5) and having, at an end thereof adjacent to the head portion (5), a plurality of expansion tabs (11) separated from each other by longitudinal slots (10) and extending in a direction toward the head portion (5), the expansion sleeve (8) further having a plastic hinge-forming transition region (13) extending toward the expansion tabs (11), with a wall thickness (t) of the expansion sleeve (8) in the transition region (13) decreasing in a direction toward a front end (9) of the expansion sleeve (8), and the plastic hinge-forming transition region (13) having an axial length (1) according to a following expression $0.5D \leq l \leq 3.0D$, where D is a connection diameter of the anchor rod (2).

2. An undercut self-cutting anchor according to claim 1, wherein the length (l) of the transition region (13) is from 1.0D to 2.0D.

3. An undercut self-cutting anchor according to claim 1, wherein the expansion sleeve (8) has, in the transition region (13) thereof, a minimal wall thickness (m) according to a following expression $0.05T \leq m \leq 1.0T$, where T is half of a difference between an outer diameter (E) of the expansion sleeve (8) and the connection diameter (D) of the anchor rod (2).

4. An undercut self-cutting anchor according to claim 3, wherein the expansion sleeve (8) has, in the transition region (13) thereof, a minimal wall thickness from 0.2T to 0.5T.

5. An undercut self-cutting anchor according to claim 2, wherein the expansion sleeve (8) has, in the transition region (13) thereof, a minimal wall thickness (m) according to a following expression $0.05T \leq m \leq 1.0T$, where T is half of a difference between an outer diameter (E) of the expansion sleeve (8) and the connection diameter (D) of the anchor rod (2).

6. An undercut self-cutting anchor according to claim 5, wherein the expansion sleeve (8) has, in the transition region (13) thereof, a minimal wall thickness from 0.02T to 0.5T.

7. An undercut self-cutting anchor according to claim 2, wherein the transition region (13) is formed as a conical section having an outer surface (14) which is inclined to an (A) of the expansion sleeve (8) at an angle (α) from about 2° to about 17°.

8. An undercut self-cutting anchor according to claim 7, wherein the outer surface (14) is inclined to the axis (A) at an angle (α) from about 5° to about 11°.

9. An undercut self-cutting anchor according to claim 1, wherein the transition region (13) is formed as a conical section having an outer surface (14) which is inclined to an axis (A) of the expansion sleeve (8) at an angle (α) from about 2° to about 17°.

10. An undercut self-cutting anchor according to claim 9, wherein the expansion tabs (11) have each a shoulder-like projecting region (15) adjoining a smaller wall thickness section of the plastic hinge-forming transition region (13) and having a substantially annular bearing surface (16) which, in an initial position of the expansion sleeve (8), forms with the axis (A) of the expansion sleeve (8) an angle (β) from about 13° to about 33°.

11. An undercut self-cutting anchor according to claim 10, wherein the bearing surface (16) forms with the axis (A) an angle from 18° to 28°.

12. An undercut self-cutting anchor according to claim 9, wherein the outer surface (14) is inclined to the axis (A) at an angle (α) from about 5° to about 11°.

13. An undercut self-cutting anchor according to claim 12, wherein the expansion tabs (11) have each a shoulder-like projecting region (15) adjoining a smallest wall thickness section of the plastic hinge-forming transition region (13) having a substantially annular bearing surface (16) which, in an initial position of the expansion sleeve (8), forms with the axis (A) of the expansion sleeve (8) an angle (β) from about 13° to about 33°.

14. An undercut self-cutting anchor according to claim 13, wherein the bearing surface (16) forms with the axis (A) an angle from 18° to 28°.

15. An undercut self-cutting anchor, comprising an anchor rod (2) having a stem (3) provided with load application means (4) at a rear end thereof and provided with a head portion (5) at an opposite end thereof, the head portion (5) having a diameter increasing toward a front end (6) of the anchor rod (2); and an expansion sleeve (8) longitudinally displaceable over the head portion (5) and having, at an end thereof adjacent to the head portion (5), a plurality of expansion tabs (11) separated from each other by longitudinal slots (10) and extending in a direction toward the head portion (5), the expansion sleeve (8) further having a plastic hinge-forming transition region (13) extending toward the expansion tabs (11), with a wall thickness (t) of the expansion sleeve (8) in the transition region (13) decreasing in a direction toward a front end (9) of the expansion sleeve (8), wherein the longitudinal slots (10) have a length s in accordance with a following expression $1.0h \leq s \leq 3.0h$, where h is a length of the expansion tabs (11) from an end of the plastic hinge-forming transition (13) region toward the front end (9) of the expansion sleeve (8), wherein length (h) of the expansion tabs (11) is $0.15D \leq h \leq 2.0D$, where D is a connection diameter of the anchor rod (2), and wherein the expansion tabs (11) have a toroidal outer surface (12).

16. An undercut self-cutting anchor according to claim 15, wherein the length (h) of the expansion tabs (11) is from 0.3D to 1.3D.

17. An undercut self-cutting anchor, comprising an anchor rod (2) having a stem (3) provided with load application means (4) at a rear end thereof and provided with a head portion (5) at an opposite end thereof, the head portion (5) having a diameter increasing toward a front end (6) of the anchor rod (2) and a curved run-on surface (7) a curvature of which increases in a direction toward the front end (6) of the anchor rod (2); and an expansion sleeve (8) longitudinally displaceable over the head portion (5) and having, at an end thereof adjacent to the head portion (5), a plurality of expansion tabs (11) separated from each other by longitudinal slots (10) and extending in a direction toward the head portion (5), the expansion sleeve (8) further having a plastic hinge-forming transition region (13) extending toward the expansion tabs (11), with a wall thickness (t) of the expansion sleeve (8) in the transition region (13) decreasing in a direction toward a front end (9) of the expansion sleeve (8).

* * * * *